United States Patent
Sauer et al.

[15] 3,696,480
[45] Oct. 10, 1972

[54] METHOD OF AND APPARATUS FOR ACCURATELY WORKING ROTARY DIE BOARDS TO RECEIVE CUTTING RULE

[72] Inventors: Louis E. Sauer; Orville C. Miller, both of St. Louis, Mo.

[73] Assignee: Centenary Central, Inc., St. Louis, Mo.

[22] Filed: July 9, 1969

[21] Appl. No.: 840,384

[52] U.S. Cl. ..........................29/26 A, 76/4, 76/107 C
[51] Int. Cl. ................................................B21k 5/20
[58] Field of Search....76/4, 107 C; 29/26 A; 90/167, 90/13

[56] References Cited

UNITED STATES PATENTS

| | | | |
|---|---|---|---|
| 2,860,555 | 11/1958 | Williamson | 76/107 C X |
| R26,192 | 4/1967 | Martin | 76/107 C X |
| 3,345,898 | 10/1967 | Dovey | 76/107 C X |
| 3,372,568 | 3/1968 | Lemelson | 90/13 X |
| 3,383,969 | 5/1968 | Saunders | 76/107 C X |
| 3,465,298 | 9/1969 | La Duke et al | 29/26 A UX |

FOREIGN PATENTS OR APPLICATIONS

| | | | |
|---|---|---|---|
| 441,750 | 2/1926 | Germany | 90/167 C |

Primary Examiner—Andrew R. Juhasz
Assistant Examiner—Z. R. Bilinsky
Attorney—Kingsland, Rogers, Ezell, Eilers & Robbins

[57] ABSTRACT

There is disclosed a method of and apparatus for developing on tape and applying a preselected rotary die design, etc., defined by spaced drilled holes, to a rotary die board automatically by a tape controlled apparatus. A computer is programmed to produce information which is transferred to a tape, or the like, fed to a numerical control machine to energize selected mechanisms to physically apply a preselected design formed by spaced drilled holes, routing, etc., to a rotary die board for reception of the spaced tangs or legs of cutting rule, or the like, or other workings. Included in the computer programming is a foreshortening of dimensions, as required, to compensate for the relative position of the cutting rule edge. Illustrated is an apparatus for drilling or drilling and routing rotary die board including an electrically actuatable structure for rotatably supporting rotary die board, an electrically actuatable traversable supporting structure for a drill head, and an electrically actuatable drill head adapted to execute desired reciprocable movements and to drill spaced holes and to rout, as signaled.

10 Claims, 17 Drawing Figures

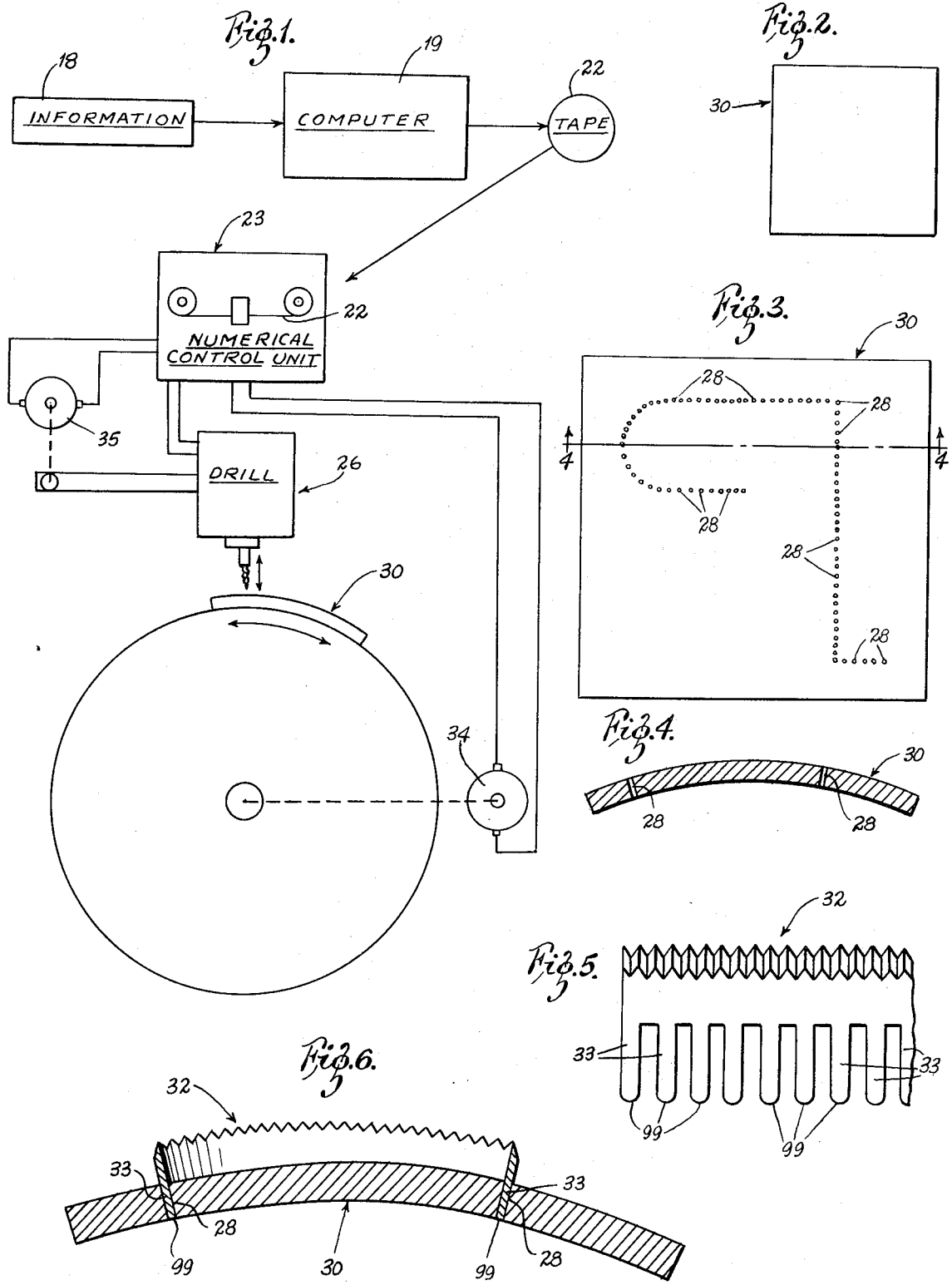

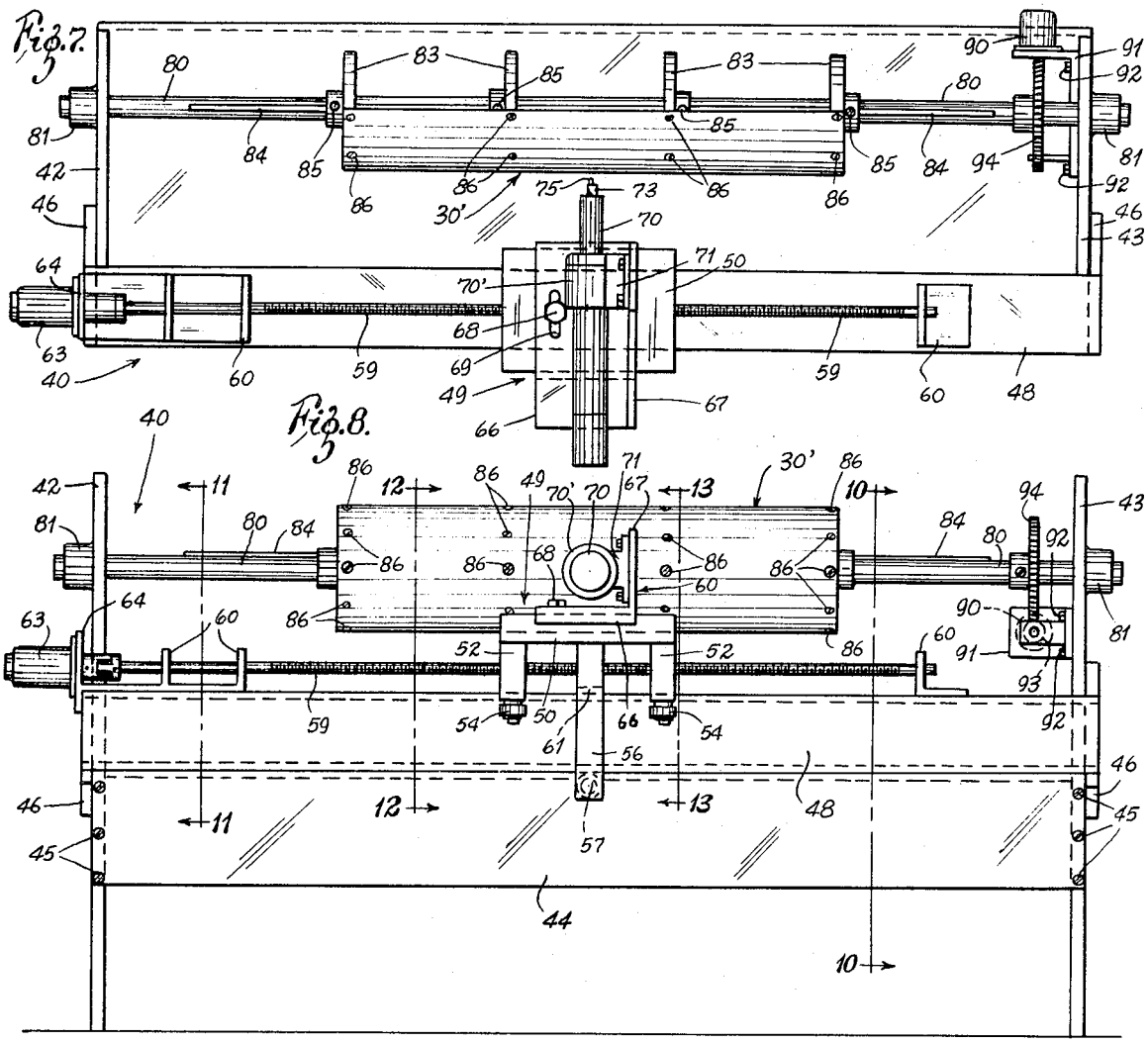
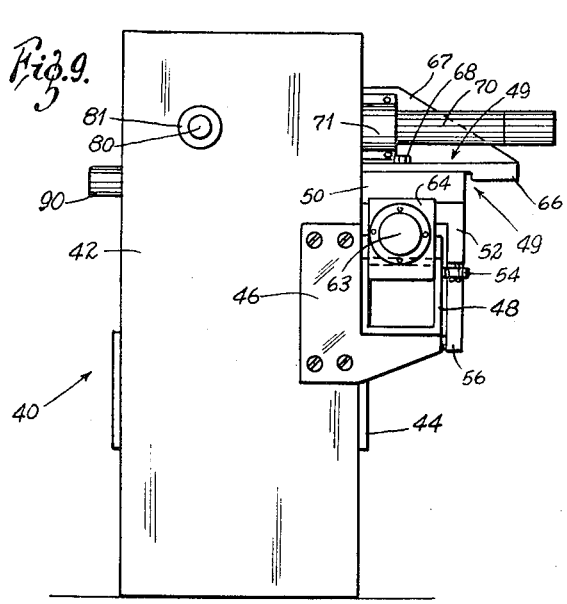
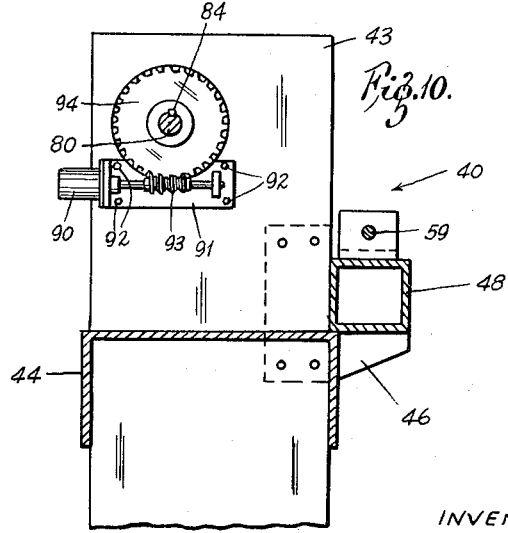

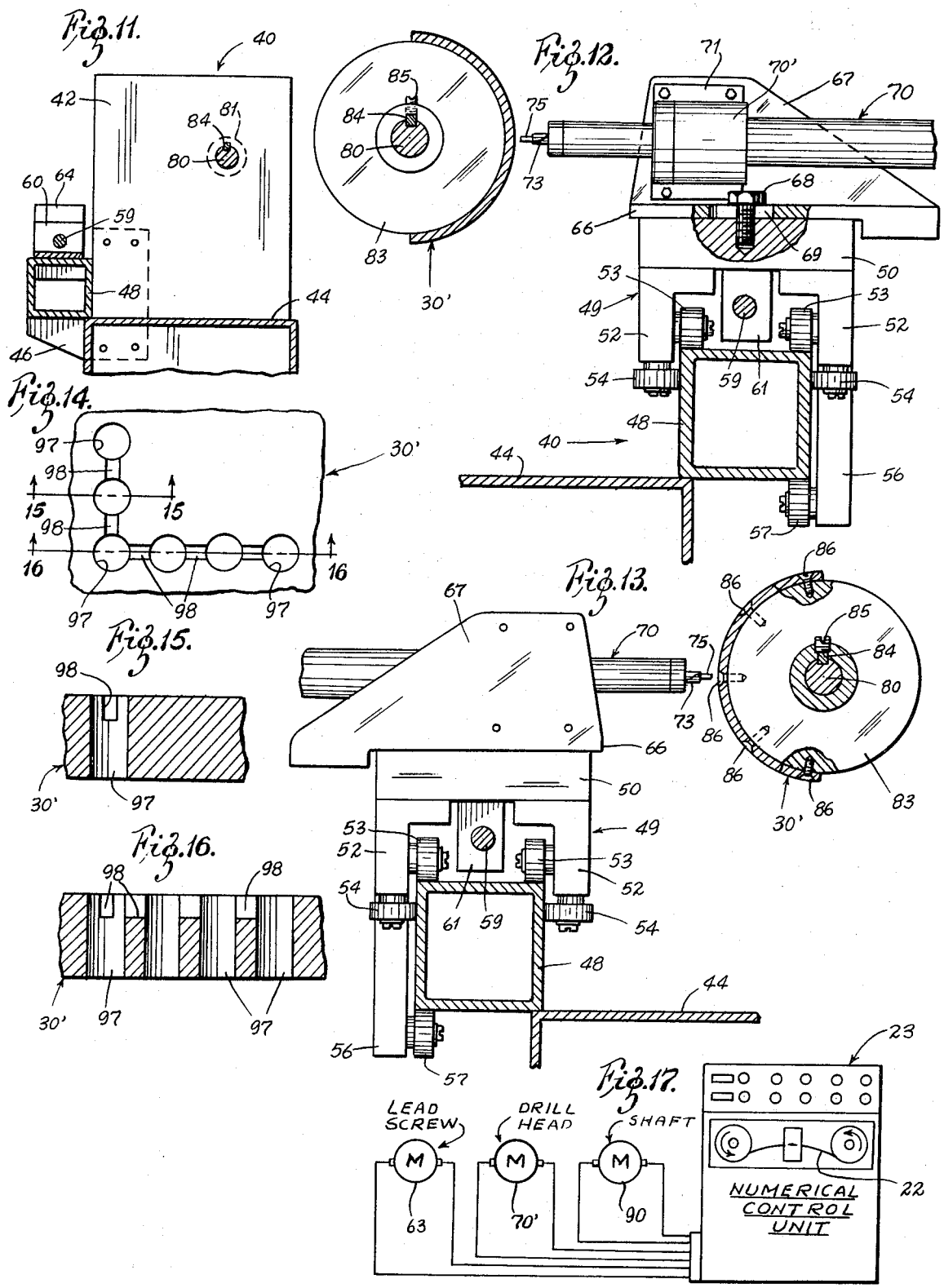

METHOD OF AND APPARATUS FOR ACCURATELY WORKING ROTARY DIE BOARDS TO RECEIVE CUTTING RULE

BACKGROUND OF THE INVENTION

1. Field of the Invention

The present invention relates generally to the die cutting art, and more particularly to a novel method of and novel apparatus for automatically providing extremely accurately worked die boards, both individually repetitive and a repetitive design on a single board adapted to receive cutting rule including spaced tangs or legs. Novel rotary die boards incorporating accurately spaced holes with or without routing, etc., and the novel end rotary dies incorporating cutting rule with spaced tangs or legs are included in the invention.

2. Description of the Prior Art

In the prior art, there are many ways and means of making dies, both flat and rotary. With particular reference to rotary dies, one method is to saw cuts in cylindrical pieces of plywood or other die material with a jig or saber-type saw, leaving ties at selected intervals, and driving cutting rule into the saw cuts. Another method is to hold the cutting rule in place by clamping blocks which are fastened to an appropriately curved piece of die material forming a sub-base. A third method is to fasten the cutting rule to the edges of blocks which are, in turn, fastened to a suitable die base. Many other methods and apparatus exist, or have been tried in the past and relegated to limbo. Identity, or even approximate identity, in successive rotary dies, or rotary die fragments, of the original design can be achieved only at great expense in time and money.

SUMMARY OF THE INVENTION

In brief, the present novel apparatus for automatically repetitively working rotary die boards achieving substantially one hundred percent accuracy in successive reproduction of the design comprises, broadly, a computer programmed from data fed therein to provide information for making a control tape, mechanism actuatable by the control tape to give electric signals or impulses, and traversable and rotatable mechanisms for operatively supporting a rotary die board and drill unit adapted to receive such electric signals for predetermined actuation thereof. The present novel method of achieving the aforesaid end product includes the steps of providing a computer, programming the same to provide information to make a tape, and the like, applying the tape to a mechanism aCtuated thereby to develop electric signals, and directing these electrical signals to electrically actuated mechanism essential to perform required work upon rotary die boards to condition the same for receiving cutting rule in the desired pattern. An embodiment of preferred apparatus so actuatable includes a rotatable support for die board, an electrically actuatable drill head adapted to function as required, and an electrically actuatable traversable support for the drill head. Included in the invention are novel rotary die boards incorporating designs defined by holes, or holes and routing, etc., produced in the novel method and by the novel apparatus, or otherwise, and novel rotary dies therefrom incorporating cutting rule having tangs or legs in the holes.

Therefore, it is an object of the present invention to provide a novel method of and apparatus for reproducing highly accurate die patterns on successive or the same rotary die boards for reception of cutting rule to fulfill the long existing need in the art. Other objects are to provide such a method and apparatus which comprise a practical solution to the long standing problem of extremely accurate repetitive rotary dies, or die fragments; which are adapted to achieve continued success over long periods of time; which are completely automatic in the execution of the die design; and which otherwise fulfill the objects and advantages sought therefor. A further object is to provide a novel rotary die board incorporating a design or designs defined by spaced holes, or holes and routing, etc., and to provide a rotary die therewith incorporating cutting rule having spaced tangs or rules operatively mounted in said spaced holes of the rotary die board.

BRIEF DESCRIPTION OF THE DRAWINGS

FIG. 1 is a diagrammatic layout incorporating the broad principles of the present invention of apparatus for developing a predetermined design for a rotary die on tape and automatically accurately translating such design through said tape to an arcuate die board or base, said design being foreshortened, as required, in the direction of rotation to properly locate cutting rule;

FIG. 2 is a plan view of an arcuate die board prior to drilling;

FIG. 3 is an enlarged plan view of a novel arcuate die board having holes therein to receive tangs or legs of cutting rule, having been drilled in accordance with the teachings of the present invention;

FIG. 4 is a vertical cross-sectional view taken on substantially the line 4—4 of FIG. 3;

FIG. 5 is a side elevational view of a fragment of cutting rule having spaced tangs or legs used for rotary dies made in accordance with the present invention;

FIG. 6 is an enlarged view similar to FIG. 4 with a cutting rule like that of FIG. 5 mounted therein;

FIG. 7 is a plan view of one embodiment of apparatus for tape controlled drilling, or combined drilling and routing, of rotary die boards in carrying out the present invention;

FIG. 8 is a side elevational view thereof;

FIG. 9 is an end elevational view thereof looking from left to right in FIG. 8;

FIGS. 10, 11, 12 and 13 are vertical transverse, cross-sectional views taken on substantially the lines 10—10, 11—11, 12—12 and 13—13 of FIG. 8, respectively, FIGS. 12 and 13 being on a larger scale;

FIG. 14 is a view of a fragment of a novel die board for cutting rule illustrating a simple drilled and routed pattern;

FIGS. 15 and 16 are radial axial cross-sectional views taken on substantially the lines 15—15 and 16—16, respectively, of FIG. 14; and FIG. 17 is a diagrammatic wiring diagram for actuation of the disclosed apparatus by a tape controlled unit.

DESCRIPTION OF THE PREFERRED EMBODIMENT

Referring to the drawings more particularly by reference numerals and initially considering FIGS. 1–6, in FIG. 1 the present novel method of and apparatus for applying designs, etc., to rotary die boards in structure and layout for receiving cutting rule are diagrammatically illustrated as to basic concepts. Information 18 covering the required design is fed into a properly programmed computer 19, which translates the information and produces a tape 22. The tape 22 can be made, of course, other than by computer, such as the programming procedure recommended and published by the Superior Electric Company, Bristol, Conn., for its SLO-SYN Numerical Tape Control. A numerical control unit 23 receives the tape 22 and translates the information thereon to the necessary electrical impulses to actuate electrical elements in accordance therewith. Such impulses may energize a traversing supported drill head 26 to bore automatically sequential holes 28 in a rotatively supported arcuate base or die board 30 and cooperatively energize a motor 34 operatively connected to rotate the die board 30 support and a motor 35 operatively connected to the drill head 26 support for traversing the drill head 26. Routing by the drill head 26 may be included. Spacings connecting holes 28 not on the axis of rotation of the die board 30 are foreshortened in the direction of rotation of the die board 30, as required, this important fact having been accomplished by the computer 19 from information supplied to it. Cutting rule 32 having tangs or legs 33 is mounted in the novel worked die board 30, as illustrated, thereby providing a novel rotary die unit ready for mounting upon a support, as a drum or shaft of a rotary die machine.

In FIGS. 7–13 is shown novel illustrative apparatus 40 for tape controlled drilling, routing, or combined drilling and routing, of rotary die boards forming the actuated component of the basic invention. The apparatus 40 includes spaced heavy end plate supports 42 and 43 which are maintained in opposed positions by a horizontal support 44 of inverted channel cross section, or any other desired cross section, by suitable bolts 45, welding or otherwise. A mounting bracket 46 is secured by machine screws to each end plate support 42 and 43 to which is secured a sturdy track 48 of square tubular cross section. The track 48 supports an axially traversible drill carriage 49 which includes a platform 50 to which are secured four corner depending legs 52. On each leg 52 is rotatively mounted a support roll bearing 53 rolling on the top of the track 48 and a side guide roll bearing 54 rolling against a side of the track 48. Also secured to the platform 50 are opposed elongated depending legs 56, each supporting a roll bearing 57 engaging the bottom of the track 48 to prevent lifting or torquing of the carriage 49.

A threaded shaft or lead screw 59 is rotatably mounted on top of the track 48 by brackets 60 (FIGS. 7, 8) and is threaded through a drive nut 61 secured to and depending from the platform 50 (FIGS. 12 and 13). A stepping motor 63 is mounted on a bracket 64 integral with the left hand brackets 60 (FIG. 8) and is connected to the shaft 59 for rotation thereof to move the carriage 49 axially.

A plate 66 having a flange 67 is mounted on the platform 50 for movement transversely of the track 48, being secured in selected position by a machine screw 68 disposed through a slot 69 in the plate 66 (FIG. 12). Preferably, interengaging channel and rib in and on the platform 50 and plate 66 together with the screw 68 maintain the integrity of the plate 66. A drill head 70 is secured in firm operative position on the plate flange 67 by a bracket 71. The adjustment provided by the screw 68 and slot 69 permits proper positioning of the drill head 70 with respect to die boards of different diameters, as appears below.

In the drill head 70 is mounted a combination drill and router bit 73, the operating end of which includes a drill portion and a stepped-down router end or tip 75, by which alternate drilling and routing can be accomplished. It will be understood that the drill head 70 is an automatic unit which provides rotary motion to drive the bit 73 as well as the reciprocating motion to drill through a die board 30', retract to the specified depth for routing the slot between holes, and finally returning to its starting position upon completion of the hole pattern. The drill head 70 may be powered electrically, hydraulically or pneumatically, but it receives its signals to operate from the numerical control unit 23.

A shaft 80 parallel with the track 48 is rotatably mounted in aligned bearings 81 supported in end plate supports 42, 43. Die board mounting discs 83 are disposed on the shaft 80 for axial movement, being maintained against rotation by a key or spline 84 in a groove in the shaft 80. Setscrews 85 in hubs of the discs 83 are provided for securing the discs 83 in selected positions. The die board 30' of semicircular cross section is mounted on the discs 83 by screws 86.

A stepping motor 90 similar to motor 63 is mounted on a bracket 91 secured by bolts 92 to the end plate support 43. A worm 93 is rotatably mounted on the bracket 91 and secured to the rotor of the motor 90 for actuation. A worm gear 94 is secured to the shaft 80 and meshes with the worm 93. The motor 90 receives electric signals and power supply from the numerical control unit 23 (FIG. 17), and in accordance therewith rotates the shaft 80 and supported die board 30' clockwise or counterclockwise.

FIG. 17 is a wiring diagram showing the simple electrical connections between the numerical control unit 23 and the lead screw motor 63, the motor 70' of the drill head 70, and the shaft motor 90. The numerical control unit 23 is actuated by the tape 22 programmed as by perforations, or otherwise, to sequentially actuate the unit 23 to predeterminately energize the motors 63, 70' and 90 to drill and/or rout the programmed design on the die board 30' in the manner broadly set forth above. Holes 97 and routing 98 result, which are adapted to receive cutting rule 32, and the like (FIGS. 5 and 6).

Manifestly, the design drilled or drilled and routed in the die board 30' can be repeated indefinitely on successive die boards or on the same die board where the basic design is small with substantially one hundred percent accuracy. Under the present method, tolerances can be held to ±0.002 inches. This is an important advantage in die making. For example, it may be desirable to repeat the design a dozen times on the single die board 30', as for small cartons or boxes. It is essential that each die be the same as the others for machinery processing, or jams, etc., will occur.

When the die board 30' is complete, it is removed from the discs 83, and the tangs 33 of cutting rule 32 (FIGS. 5 and 6), or the like, are forced into the holes 97 until the solid portion above the tangs 33 is snugly in routing 98 which is only 0.001 inches to 0.002 inches wider than the rule. Extreme accuracy is obtained in the dies. For small diameter dies, tangs 33 are rounded at 99 for ease of entry into the holes 97.

It is clear that there have been provided a novel method of and novel means for making accurate dies, novel controlled apparatus for effecting drilling or drilling and routing of die boards, and novel rotary die boards with spaced holes, routing, etc., and novel rotary dies.

It is to be understood that the foregoing description and the accompanying drawings have been given by way of illustration and example. It is also to be understood that changes in form of the several parts, substitution of equivalent elements or steps, and rearrangement of parts or steps, which will be readily apparent to one skilled in the art, are contemplated as within the scope of the present invention, which is limited only by the claims which follow.

What is claimed is:

1. In combination, a system for providing a preselected design and accurately applying it to die board for the drilling of spaced holes therein adopted to receive the tangs or legs of cutting rule comprising means for developing data for a preselected die design adapted to be converted to a punched tape and the like, means for converting said developed data into a punched tape and the like, mechanism for receiving said tape responsive thereto to produce electrical impulses, and means responsive to said electrical impulses adapted to physically apply said preselected design to a die board in the form of spaced holes, said spaced holes embodying said physically applied preselected design being adapted to receive the spaced tangs or legs of cutting rule so formed.

2. The combination of claim 1 in which the die board worked is arcuate.

3. The combination of claim 2 in which said first means comprises a computer programmed to foreshorten dimensions not axial.

4. The combination of claim 3 in which said mechanism comprises a tape controlled unit programmed to control a selected number of electrically actuated machines.

5. The combination of claim 2 in which said means responsive to said electrical impulses comprises a plurality of electrically actuated machines adapted to support a rotary die board and selected tools for physically working the rotary die board.

6. The combination of claim 5 in which said electrically actuated machines are adapted to repeat the preselected design with high accuracy on a single die board and on successive die board.

7. The combination of claim 6 and including an electrically actuated drill adapted to drill spaced holes in a rotary die board defining the preselected design.

8. The combination of claim 7 and including routing means for routing between holes to accurately snugly receive cutting rule.

9. The combination of claim 8 in which a rotary die board is rotatively supported and said drill is supported for traversing movement to provide combined universal positioning of said drill and routing means.

10. The combination of claim 9 in which the developed data includes foreshortening of dimensions not on axial lines.

* * * * *